United States Patent [19]

Nopper et al.

[11] 4,382,758

[45] May 10, 1983

[54] APPARATUS FOR MANUFACTURING CELLULOSIC FIBROUS MATERIAL WHICH CAN BE PRESSED INTO MOLDED PARTS

[75] Inventors: Herbert Nopper, Kuppenheim; Wolfgang Knoch, Gernsbach, both of Fed. Rep. of Germany

[73] Assignee: Casimir Kast GmbH & Co. KG, Gernsbach, Fed. Rep. of Germany

[21] Appl. No.: 264,656

[22] Filed: May 18, 1981

Related U.S. Application Data

[62] Division of Ser. No. 85,763, Oct. 17, 1979, Pat. No. 4,290,988.

[30] Foreign Application Priority Data

Oct. 17, 1978 [DE] Fed. Rep. of Germany ....... 2845112

[51] Int. Cl.³ ............ B29C 13/00

[52] U.S. Cl. ............ 425/82.1; 425/83.1

[58] Field of Search ............ 425/82.1, 83.1

[56] References Cited

U.S. PATENT DOCUMENTS

| | | | |
|---|---|---|---|
| 2,152,901 | 4/1939 | Manning | 264/115 |
| 2,161,224 | 6/1939 | Berghoff | 264/115 |
| 3,492,388 | 1/1970 | Inglin-Knüsel | 264/122 |
| 3,880,975 | 4/1975 | Lundmark | 264/122 |
| 3,927,235 | 12/1975 | Chow | 264/122 |
| 4,167,378 | 9/1979 | Hagg et al. | 425/83.1 |

*Primary Examiner*—James R. Hall

*Attorney, Agent, or Firm*—Antonelli, Terry & Wands

[57] ABSTRACT

An apparatus for manufacturing cellulosic fibrous material suitable for future compressing into a molded article which comprises a prepulverizing apparatus for cutting cellulosic material, a mixing chamber for mixing the prepulverized cellulosic material with a bonding material, a forming head for receiving the mixture from the mixing chamber and for dispensing the cellulosic fibrous material/binder mixture as a mat upon a moving carrier, a heating apparatus for heating the mat and a pressing apparatus for compacting and bonding the heated fibers in the mat.

4 Claims, 1 Drawing Figure

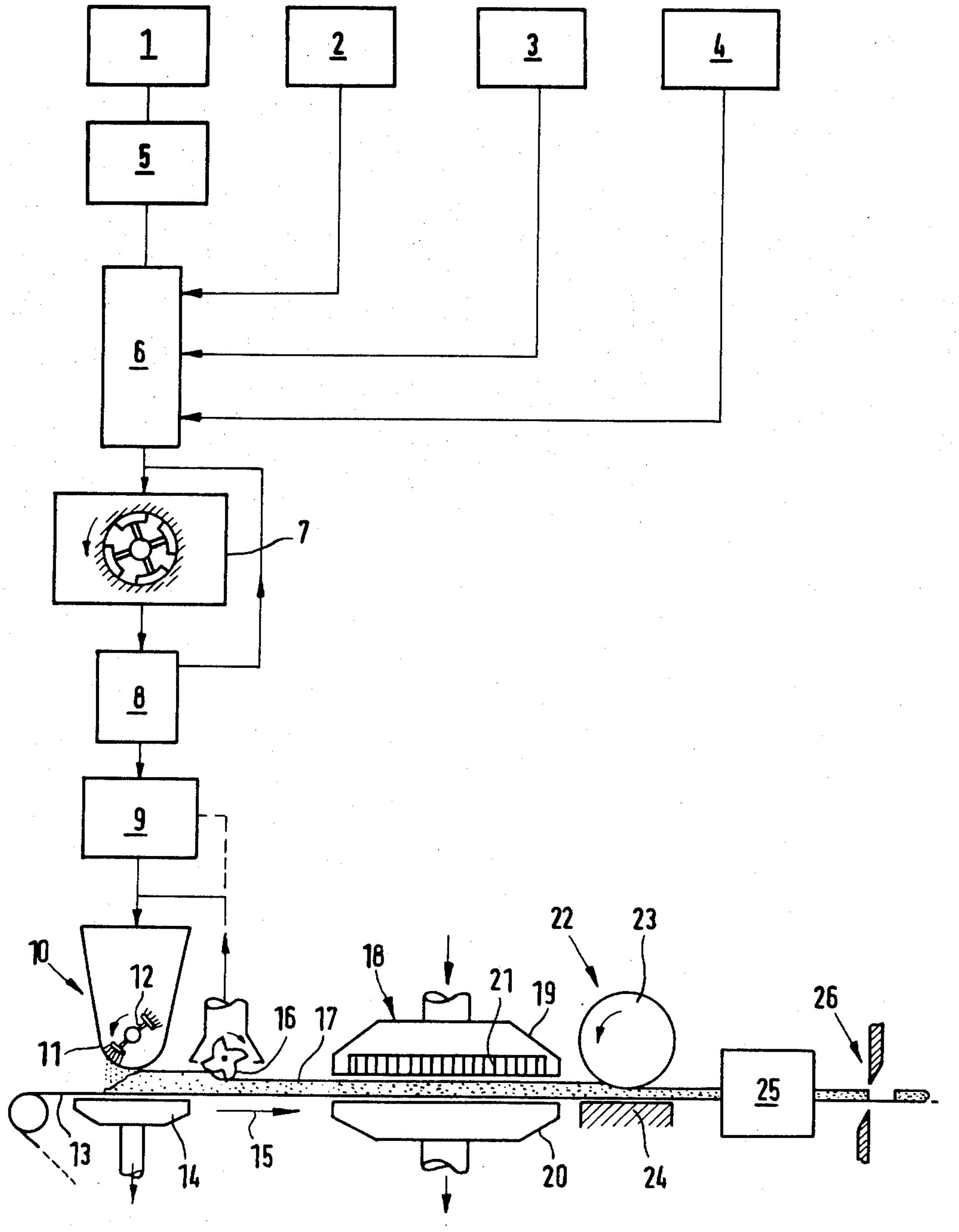
1
2
3
4
5
6
7
8
9
10
11
12
13
14
15
16
17
18
19
20
21
22
23
24
25
26

APPARATUS FOR MANUFACTURING CELLULOSIC FIBROUS MATERIAL WHICH CAN BE PRESSED INTO MOLDED PARTS

This is a division of application Ser. No. 085,763, filed Oct. 17, 1979 now U.S. Pat. No. 4,290,988 issued Sept. 22, 1981.

The invention relates to a method for the manufacture of cellulosic fibrous material which can be pressed into molded parts, which method may involve: cutting up of cellulosic material into fibrous material, mixing of the fibrous material with at least one thermoplastic and at least one duroplastic (thermosetting) bonding agent, forming from the mixture a fleece, and compressing the fleece under the action of heat to a transportable pressable mat. The invention also relates to an apparatus for carrying out of such method, as well as a particularly advantageous method for the pressing of the cellulosic fibrous material obtained.

Cellulosic fibrous material is used to a considerable extent for molded parts for the interior construction of houses, for the furniture industry, for packing, and above all for interior fittings (door claddings, instrument panels, protective covers, vehicle roof covers, etc.) of vehicles. These molded parts are characterised, compared with parts which are made exclusively from plastics material, by a high degree of strength, favorable deformation properties, manifold manufacturing possibilities, and lower cost. Known methods of manufacturing molded parts from cellulosic fibers include wet methods in which the fibrous material is deposited from a suspension on mold sieves, and dry methods to which in particular the method of the above described type belong.

With a known method of the above described type (see German Specification No. 2417243), wood fibers, which are obtained by cutting up in a pulp grinder chips obtained from logs, are glued with thermoplastic natural resin derivatives mixed with duroplastic bonding agents, (usually phenolic resins) and scattered in a so-called felter to form a fleece. The fleece is brought by means of a doctor blade or rotating cutters to a predetermined thickness, heated and precompressed. A mat-like cellulosic fibrous material results which in this form is transportable and commercially viable and can be pressed under pressure and heat action to form molded parts.

This known method has various drawbacks. The use of high grade logs and the necessity of cutting up in the pulp grinder entails considerable production costs. The necessary wet cutting requires a considerable amount of water which is disadvantageous for reasons of cost and environmental protection. The fibrous substance obtained by the wet cutting has a considerable water content which leads to a tendency for the fibers to clog giving an uneven fleece thickness and in addition necessitates complicated and tedious drying and pressing procedures in order to drive out the residual moisture. With the known method the tendency of the fibrous substance to agglomerate makes it furthermore difficult to achieve a uniform mixture with the bonding agents. These agents are therefore added in melted form or in the form of solutions and this is complicated and renders even more difficult achieving a good homogeneity.

The natural resin derivatives used in the known method are comparatively costly and there is an undesirable tendency for sticking to occur in parts of the apparatus, and also, as explained, uniform mixing is difficult. Furthermore, it is especially disadvantageous that these natural resin derivatives are comparatively brittle and have only a low binding capacity. In consequence it is necessary to compress the fleece comparatively highly to a density of at least 0.6 g/cm$^3$ in order that bonding can be obtained which is sufficiently firm for transport. This is undesirable because for reasons of cost and weight the production of molded parts of as little density as possible while having satisfactory mechanical properties is aimed at. Added to this is the fact that according to this known method mats obtained upon compressing the fleece are very fragile so that with the finished pressing without special measures only very flat molded parts can be manufactured. In the pressing of deeply recessed molded parts the breaking of the mats can only be prevented if these are preformed and made sufficiently flexible by damping. This is complicated and leads above all to an increase in the moisture content which in the finished pressing must again be driven out. In order to avoid damage due to the necessarily formed steam in the finished pressing, in the final pressing a complicated sequence of several strokes must be carried out which is complicated and because of the correspondingly long pressing cycle is expensive. According to a known method of similar type (see German Specification No. 2417243) in order to remove these drawbacks, as a binding agent, artificial latex dispersions are used. However, a satisfactory solution to all the problems explained is not provided thereby because the aqueous artificial latex dispersions in addition cause an undesired increase in the moisture content of the fibrous material.

Finally the known method of the type described above results in molded parts which leave much to be desired in their quality. A sufficiently smooth and uniform surface is in practice not feasible and above all there is a tendency for exudation of the natural resin derivatives to occur. In particular, in conjunction with the unsatisfactory homogeneity of the mixture, blemishes may be formed which are very discolored and can only be sized or lacquered with difficulty or not at all. Furthermore, molded parts manufactured in accordance with the above known method show unsatisfactory shape resistance in moist surroundings because swelling is caused by considerable moisture absorption.

An object of the present invention is to provide a method of the above described type with which, in a simple and inexpensive manner, will permit the manufacture of cellulosic fibrous material which is characterised by good homogeneity and mechanical properties, and which will permit of the finished pressing of the material in a simple manner into molded parts of high quality. A further object of the invention is to provide an apparatus for carrying out such a method, and to provide a particularly advantageous method for pressing cellulosic fibrous material manufactured thereby to form molded parts.

According to a first aspect of the invention there is provided a method for the manufacture of cellulosic fibrous material which can be pressed into molded parts in which cellulose-containing material is separated into fibrous material, the fibrous material is mixed with a bonding agent, which may comprise at least one thermoplastic and at least one thermosetting substance, a fleece is formed from the mixture, and the fleece is compressed under heat action to give a transportable pressable mat, wherein as cellulose-containing material wastes from cellulosic fibrous material are used, such cellulosic fibrous material is cut up and ground dry to form fibrous material and the bonding agent is added in the form of dry powder.

The method according to the invention thus proceeds not from expensive logs or round timber which needs to be broken up by a wet separation into fibers but from waste from cellulosic fibrous material which has already been processed by cutting into fibers and in which thus the fibers are no longer bound together in the natural state and therefore can be cut up into fibers in a simple manner, namely by dry grinding. The method according to the invention can be adapted by choice of type and quantity of binding agents to application to practically all feasible cellular fiber materials. Suitable in particular are wastes from paper, cardboard, textiles, etc., especially of corrugated paper and soda-Kraft-papers. These materials are characterised in that the fibers are, as it were, dead, and hardly take up any water so that the molded parts manufactured therefrom are in moist surroundings of remarkable dimensional stability. Furthermore, there is the advantageous possibility of employing additionally under certain circumstances, even in a predominant portion, peat, bark, and in particular preferably dried plant parts of annual plants such as straw or the like. All these materials are available at low cost and practically in unlimited quantity. Animal, plant and synthetic (for example viscose) fibers for example in carpet wastes can also be used.

Of particular importance is the disintegration of these materials according to the invention by dry grinding. The employment of water, with all the problems of an extensive water consumption, is thus not necessary. On the contrary the grinding leads to a reduction in the residual moisture. As a result of the grinding process there is produced a fiber material of little moisture content and outstanding pressing capability which has no tendency to agglomeration. Thus there is the possibility of adding the binding agent in the form of dry powder, and the particle size of the powder can vary and may comprise granules. The binding agent and any additive materials are added to the cellulosic fibrous material preferably before grinding and during grinding are mixed with the fibrous material so that an exceptionally uniform distribution results.

As a thermoplastic binding agent preferably there is used an extrudible thermoplastic plastics material such as polyethylene, polypropylene, polyester, polyamide, PVC etc., usually in a proportion by weight of 5 to 30% preferably 5 to 10% of the mixture. Here and in the following the particulars of proportions by weight relate to absolute dry weight (bone-dry) of the components. The use of these thermoplastic plastics leads to a substantially improved flexibility and tensile strength of the mat obtained upon compression. As thermoplastics bonding agent low pressure polyethylene is for example very suitable which, with regard to heat resistance of the molded parts, should have a melting point of about 135° C. With higher requirements as to tensile strength and heat resistance the use of polypropylene is recommended which is obtainable very cheaply in the form of carpet waste. A further advantage of the thermoplastic plastics consists in that with them at the same time a hydrophobic effect is achieved and thus the moisture resistance of the molded parts is improved.

It has proved particularly advantageous if the thermoplastic bonding agent is introduced in the form of a powder (i.e. a particulate material), the particles of which have a fiber structure. This leads to a construction of an exceptionally uniformly voluminous and loose fleece which with a small portion of thermoplastic binding agent has a satisfactory strength after compression. At least partly the thermoplastic binding agent can be used in the form of papers, for example, filter papers coated with thermoplastic plastics as the thermoplastic and duroplastic binding agents do not have to be added separately under all circumstances but according to the raw material used may be contained already completely or partly in the same.

The duroplastic bonding agent which usually is added in a larger proportion by weight than the thermoplastic binding agent, and in any case as dry powder, may as in the known method, consist of phenolic resins which however are preferably modified, for example, with hexamethylene tetramine in order to give good storing capacity with high strength after hardening at increased temperature. Suitable furthermore are polyester resins. These duroplastics bonding agents are added in proportion by weight of 5 to 20% bone dry, preferably 10 to 15% bone dry referred to the mixture. Particularly advantageous is the use of blocked isocyanates and indeed in a proportion by weight of 5 to 10% bone dry referred to the mixture. Blocked isocyanates are in contradistinction to normal isocyanates capable of storage at room temperature without trouble and react only at higher temperatures of, for example, 130° to 180° C., which temperatures can be reached at the final pressing, and unlike the aforementioned duroplastic bonding agents a reactive binding with the fibrous material can occur which in particular is advantageous with the use of straw or the like.

According to the intended use of the molded parts there may be added to the mixture additives such as dyes, fillers, flame proofing agents, insecticides, fungicides or the like.

From the mixture obtained by grinding in known manner a fleece is formed which then under the action of heat and pressure is compressed to form a mat, and the moisture content is still further reduced by the action of heat. The fleece by softening the thermoplastic plastics is, so to speak of, sintered together thereby and can be compressed to a density of 0.03 to 0.3, preferably 0.8 to 0.2 g/cm$^3$. The hardening temperature of the duroplastic binding agent is thereby not yet reached but is only reached with the final pressing. The mat obtained is characterised by high flexibility and strength and may be used either directly as a mat or without problem can be transported for further processing.

Usually the fleece is formed on a fleece carrier running therewith which for use with possible suction chambers may also be air permeable. In a further embodiment of the invention, the cellulosic fibrous material is bound by the compression to the fleece carrier. The fleece carrier which, for example may consist of thermoplastics fibers, of cellular wool fleece, paper, crepe paper, etc. may as a protective layer facilitate thereby considerably a later disturbance-free manipulation of the cellular fiber material. The bonding of the fleece carrier to the cellular fiber material is effected by means of the bonding agent, above all by the thermoplastic plastics agent.

According to a further aspect of the invention an apparatus for carrying out the method described above is characterised by a pre-pulverising apparatus in which the cellular fiber material is cut up and which, for example, may be constructed as a cutting or hammer mill, by a mixing chamber in which the cellulose-containing material is mixed with the binding agent and, if necessary, with any additive substances and is formed preferably as a whirling chamber, by a grinding mechanism in which the dry cutting into fibers takes place, by a rotating fleece carrier, by a forming head by means of which the fleece is formed on the fleece carrier, by a heating apparatus and by a pressing apparatus. A cooling apparatus may be connected to the pressing apparatus, and a separating apparatus for dividing the mat into sections of predetermined lengths may be provided in the usual manner.

The grinding mechanism is preferably formed as a jaw grinding mill which has friction jaws disposed on the inside of a rotational cylindrical surface which may be stationary or driven in a rotatable manner, as well as concentrically arranged striking bars arranged on a rotatable carrier (a striking cross or striker wheel) which is rotatable inside the rotational surface. The forming head may be formed as a conventional felter. Preferably however the head comprises a sieve in the form of a cylindrical segment and brushes rotatably concentrically thereto inside the sieve. The mixture of fibrous material, binding agent and additive substances is scattered into the sieve and is distributed by the brushes through the sieve openings uniformly onto the fleece carrier.

For the heating apparatus, there are different possibilities known in the prior art. Especially preferred, however, is a new form of apparatus in which the fleece is flowed through by heated gas, particularly air. This heating apparatus has an excess pressure chamber and a reduced pressure chamber (of which one may be at atmospheric pressure) which are arranged opposite one another with respect to the fleece carrier and are arranged for producing the heated air flow passing through the fleece.

A particularly advantageous apparatus for the manufacture of molded parts from the cellulosic fibrous material obtained as described above is characterised in that the cellulosic fibrous material is brought in the dry state between pressing tools of a mold press and is pressed in one pressing stroke. A damping which leads to an undesired increase of moisture as well as a preforming of the cellulosic fibrous material which is usually necessary in pressing cellulosic fibrous material obtained according to the known method described above at least when pressing in comparatively deep molds for increasing the flexibility, need not be provided. The low moisture content of the cellulosic fibrous material obtained according to the invention of about 2 to 6% bone dry weight compared with a moisture content of the cellulosic fibrous material obtained according to the known method of about 10 to 12% normally even 15 to 18% bone dry weight renders it possible to press the molded parts without a complicated pressing program in a single pressing stroke. The pressing may take place either between heated press tools or the cellulosic fibrous material may be pressed after pre-heating and between only tempered pressing tools. The pre-heating may lead to a temperature of the cellulosic fibrous material of about 100° to 160° C., preferably 120° to 140° C. to which the hardening temperature of added duroplastic is of course adapted. "Tempering" of the pressed tools means heating the tools only to about 80° to 100° C. The hardening of the duroplastic is therefore obtained during the pre-heating. The pre-heating with following finishing pressing between only tempered press tools leads to an accurately controllable moisture regulation and to an improved deformability of the cellulosic fibrous material which is particularly important in the pressing of complicated deeply recessed molded parts. In addition there is an advantageous shortening of the pressing cycle times. In any case with finishing pressing only comparatively low temperatures, which even with finishing pressing between heated press tools do not exceed about 120° to 140° C., and comparatively short pressing times, as a rule a maximum of 30 seconds, are necessary.

The method and apparatus according to the invention permits an effective moisture regulation in that in three stages a drying can be effected: with the dry grinding, with the heating of the fleece before the compression to form cellulosic fibrous material, and with the pre-heating before the finishing pressing.

With the finishing pressing of the molded parts a compression is effected which depends on the purpose of use and above all is determined by the requirement with regard to strength and damping capacity. For example molded parts for vehicle roof linings are compressed to a density of 0.3 to 0.6 g/cm$^3$ with a thickness of 3 to 8 mm, and molded parts for higher stresses to a density of 0.7 to 1.1 maximum 1.2 g/cm$^3$ with a thickness of 2 to 4 mm. A particularly advantageous possibility which depends on the strength properties achieved with small thicknesses consists in pressing the cellulosic fibrous material to different end thicknesses. For example with a vehicle roof lining the edge areas may have to be pressed to a greater thickness and the middle regions, which above all is to have good damping and sound excluding properties, to a smaller thickness.

A further advantageous possibility which arises especially in the working with only tempered pressing tools consists in inserting a surface layer, for example, a foil or a textile layer (fleece, fabric, knitwear) of thermoplastic material before the pressing in at least one of the pressing tools so that it connects to the molded parts. If the surface layer consists of a material of suitable heat resistance (for example, of cellular wool) then it can be inserted directly also between heated press tools. In both cases due to the portion of thermoplastic plastics in the mold part a surface layer is welded to this in a single working step on pressing.

The invention will now be described further by way of example only and with reference to the accompanying drawing which shows one form of an apparatus for carrying out the method of the invention.

Starting materials for the method are kept ready for use in silos 1 to 4. In silo 1 there is cellulosic material in the form of wastes from paper, cardboard, etc. In silo 2 there is a thermoplastic bonding agent in the form of a dry powder of fiber-like particles of polyethylene. In silo 3 there is a duroplastic bonding agent of blocked isocyanate. In silo 4 there are additive substances, for example, an organic flame proofing agent. The paper and cardboard wastes are fed to a cutting mill 5 where they are cut up into particles with a dimension of about 5×5 mm. The cut up cellulosic fibrous material passes from the cutting mill 5 into a spinning section 6 in which it is mixed with the bonding agents and additive substances fed from the silos 2,3,4. The conveying of all these components takes place pneumatically. In addition there are connected to the silos dosage weighing devices (not shown) for controlling the mixing ratios. The spinning section 6 is connected to jaw grinding mill 7 in which the cellulosic fibrous material is ground dry and is thereby separated into fiber and at the same time is mixed with the binding agents and the additive substances. The ground material passes from the mill into a sifter 8 from which the lowest fraction is returned to the inlet of the mill 7. The sifter 8 is connected to a mixing silo 9 in which the mixture for the further working steps is stored ready for use.

From the mixing silo 9 the mixture passes to a forming head 10 which has essentially on its free underside a sieve 11 in the form of a cylindrical segment, and a multi-armed brush 12 which is rotatable concentrically within the sieve 11, which brush scatters the mixture down through the sieve openings uniformly onto a fleece conveyor 13, which in the embodiment shown is an endless rotating sieve, and thus forms the fleece. For the compression and felting of the fleece there is disposed under the forming head 10 a suction chamber 14. The fleece conveyor 13 conveys the fleece, in the direction of the arrow 15, first under a rotating cutter 16, by means of which the thickness of the fleece 17 is adjusted. Removed material is sucked off and is returned to the head 10 and the mixing silo 9. Following the cutter 16 is a heating apparatus 18 in which hot air is caused to flow through the fleece 17. The heating apparatus 18 consists essentially of a pressurized chamber 19 disposed above the fleece conveyor 13 and a suction chamber 20 disposed therebelow. The increased pressure and reduced pressure are maintained by a blower not shown. Air flows from the pressurised chamber 19 to a heater 21, which consists of electrical heating elements with free flow channels therebetween, and is thereby heated and then flows to the fleece 17 and is finally extracted by the suction chamber 20. The fleece 17, while continuously advancing, is thereby heated uniformly over its entire thickness to the plasticising temperature of the thermoplastic plastics material, and, at the same time, the residual moisture is adjusted to the desired level. Directly following the heating apparatus 18 there is a pressing apparatus 22 in which the fleece 17 is compressed to a desired thickness by means of a pressing roller 23, also while continuously advancing. The pressure roller 23 is rotated by means of drive (not shown) and is adjustable with respect to the pressing pressure or its distance from a lower pressing table 24. The resulting formed mat is cooled to room temperature in a cooling apparatus 25, which is connected to the pressing apparatus 22 and is constructed and operates similarly to the heating apparatus 18. The mat is finally separated in sections of predetermined length in a separating apparatus 26. The fleece conveyor 13, after the removal of the mat sections, is returned under the apparatus described to the forming head 10. The further processing of the mat sections into finished mold parts takes place in a conventional press and requires no detailed explanation.

We claim:

1. An apparatus for manufacturing a dry-shaped cellulosic fibrous transportable mat suitable for future compressing into a molded article, comprising:

(a) a pre-pulverizing apparatus for cutting and forming cellulosic waste material in dry form into pre-pulverized material, (b) a mixing chamber and grinder for mixing said pre-pulverized material with a bonding material in dry form comprised of at least one thermoplastic bonding agent and one thermosetting bonding agent, (c) a forming head for receiving said mixture from said chamber and for dispensing the mixture as a layer upon a moving carrier, (d) a heating means for plasticizing the thermoplastic bonding agent in said layer without setting of the thermosetting bonding agent therein, (e) a pressure roller for compacting and bonding the layer into a transportable mat, (f) a cooling means for cooling said transportable mat, and (g) a cutter for cutting said transportable mat to select sizes.

2. The apparatus according to claim 1, wherein said grinder is a jaw grinder comprising friction jaws arranged on the inside of a rotational surface and concentric with striking bars positioned inside of said rotational surface.

3. The apparatus according to claim 1, wherein said forming head comprises a sieve in the form of a cylinder segment and a brush which is rotatably mounted concentrically inside of said sieve.

4. The apparatus according to claim 1, wherein said heating apparatus comprises a pressure chamber and a suction chamber, said chambers being positioned on an opposite side of said moving carrier in a manner producing a heated air current for passing through the layer therebetween.

* * * * *